June 26, 1956   H. B. LEWIS   2,751,904
RESPIRATOR
Filed Sept. 30, 1952   2 Sheets-Sheet 1
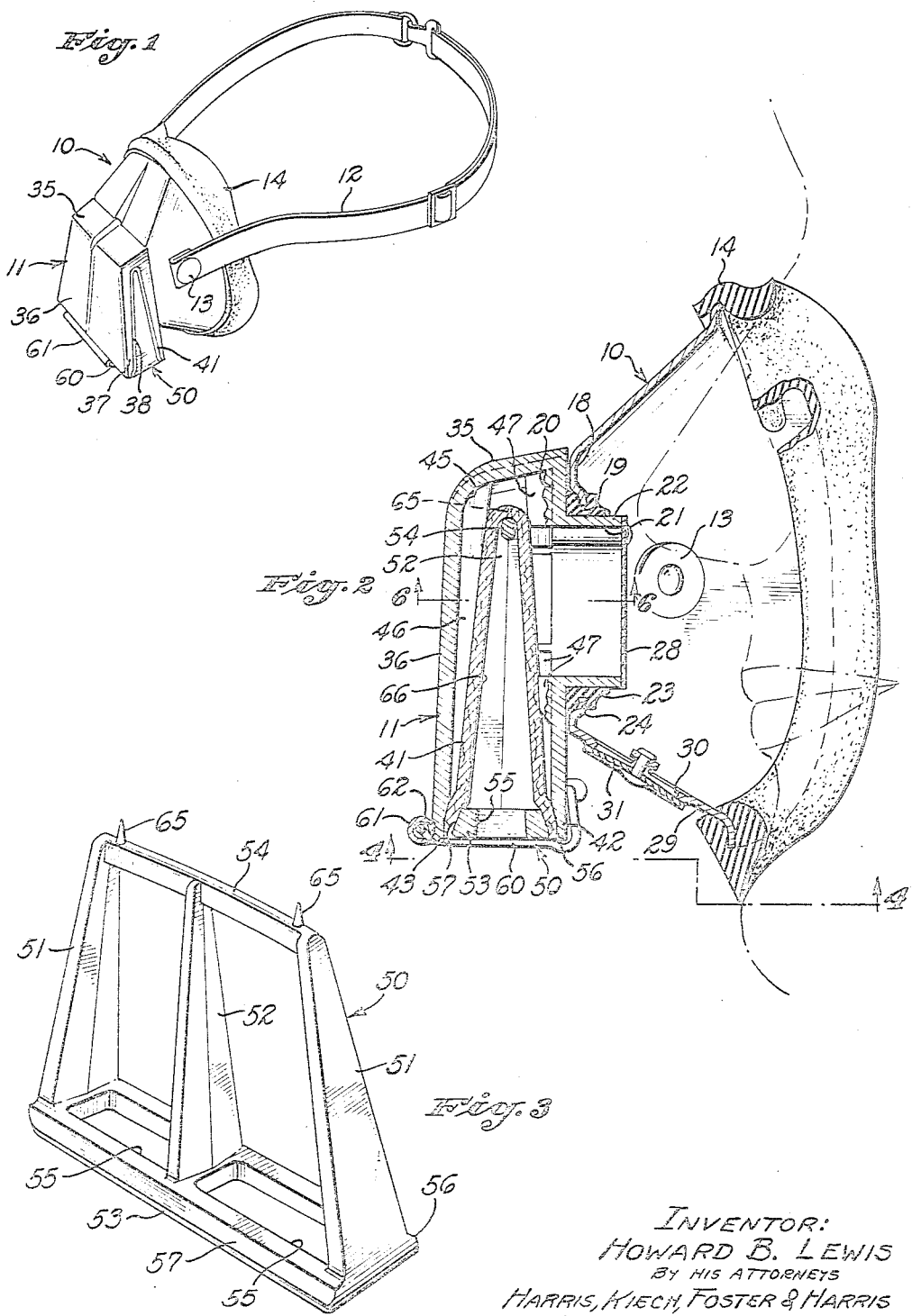
INVENTOR:
HOWARD B. LEWIS
BY HIS ATTORNEYS
HARRIS, KIECH, FOSTER & HARRIS

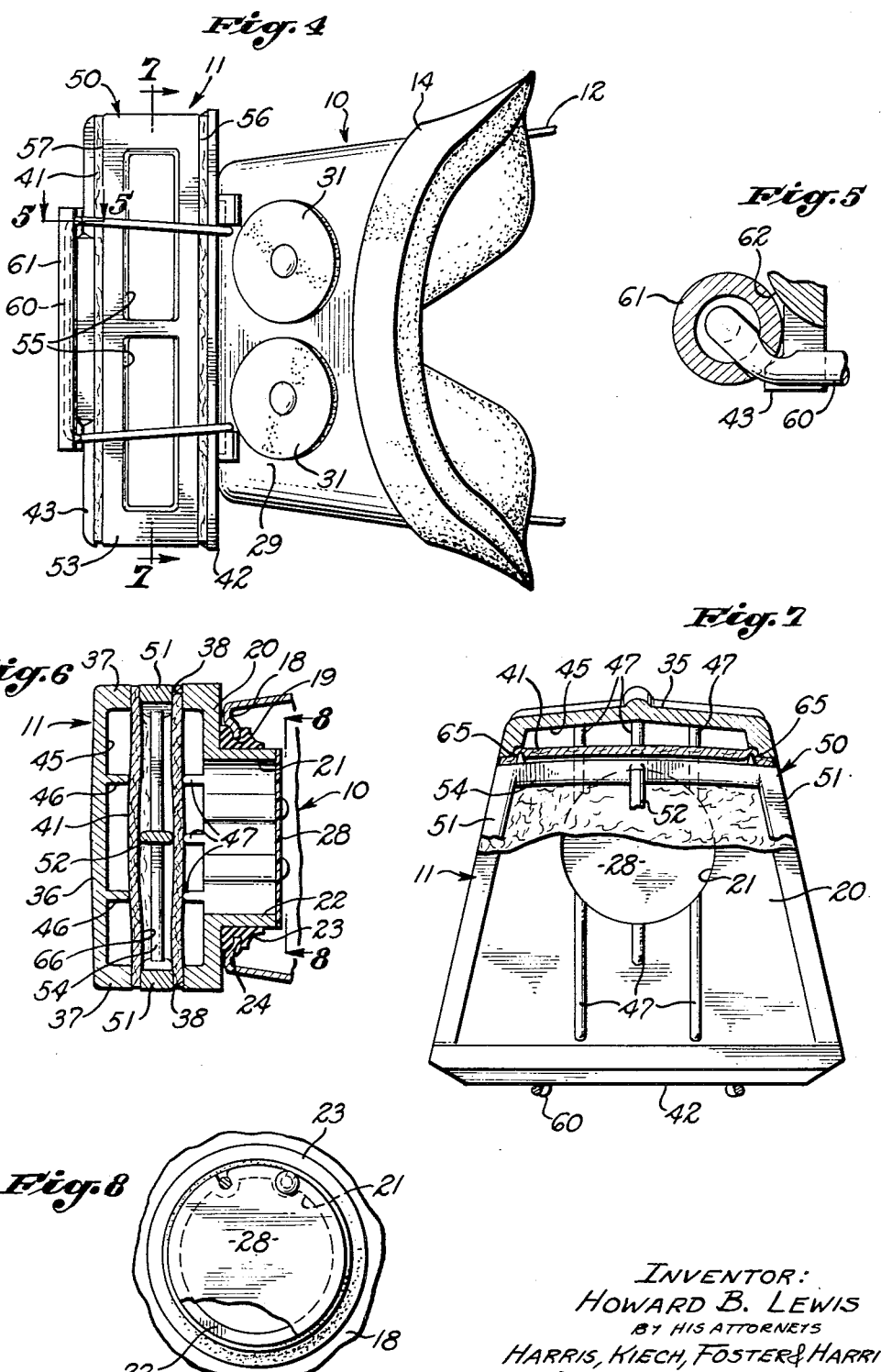

United States Patent Office 2,751,904
Patented June 26, 1956

2,751,904

RESPIRATOR

Howard B. Lewis, Newport Beach, Calif.

Application September 30, 1952, Serial No. 312,245

12 Claims. (Cl. 128—146)

The present invention relates to respirators and, more particularly, to a respirator adapted to be worn on the face of the user and to remove dust, gases, and the like, from the air breathed by the user, the present invention embodying improvements on the respirator of my Patent No. 2,220,374, granted November 5, 1940.

In general, the respirator of the present invention includes a mask which is adapted to fit the face of the wearer and to cover the nostrils and mouth of the wearer, the mask having an inlet opening for inhaled air and having an outlet opening for exhaled air. Inhalation and exhalation valves control the flow of air through the inlet and outlet openings, respectively. The respirator also includes a filter which is mounted on the mask and which is provided with an outlet opening in communication with the inlet opening in the mask. The filter houses a filter element for removing dust particles or gases from the air, the filter element preferably being a sheet of filtering material in the case of dust particles, or the like, and comprising charcoal particles, for example, in the case of gases, although other filter elements may be used.

A primary object of the invention is to provide means for mounting the filter on the mask which includes a tube mounted on one of these members and a sealing element mounted on the other, the tube being insertable into the sealing element so as to retain the mask and the filter in assembled relation. The tube may be mounted on the filter and the sealing element may be mounted on the mask in engagement with the periphery of the air inlet opening in the mask, in which case the tube forms the air outlet opening in the filter, the filter being attachable to the mask merely by inserting the tube into the sealing element carried by the mask.

Another object is to provide a sealing element which is detachably connected to the mask through the provision of a peripheral groove therein which receives the periphery of the air inlet opening in the mask, the tube, when inserted into the sealing element, locking the sealing element in place.

Another object is to provide a respirator wherein the inhalation valve is carried by the inner end of the aforementioned tube on the filter.

Another object of primary importance is to provide a respirator for dust particles which relies on inertial separation of the dust particles from the air to a large extent so as to minimize dust accumulations on most of the filter element. This minimizes the resistance of the filter element to air flow therethrough, thereby facilitating breathing through the filter element, which is an important feature.

Another object of the invention is to provide a filter wherein the filter element is held in place in a housing by a hollow, wedge-shaped frame open at the bottom and insertable into the bottom of the housing, the frame having upwardly converging, generally V-shaped end walls which fit into complementary notches in the end walls of the housing and which have edges registrable with the edges of the notches to clamp the filter element therebetween. A related object is to provide the frame with other edges which are registrable with the lower edges of the side walls of the housing to clamp the filter element therebetween also, the edges of the notches and the lower edges of the side walls of the housing being continuous to provide a continuous seal around the entire periphery of the filter element.

Another object of the invention is to provide the retaining frame for the filter element with one or more spikes thereon which are adapted to impale the filter element to hold it firmly in place. This prevents slippage of the filter element as it and the frame are inserted into the housing, thereby facilitating filter changes, which is an important feature.

The foregoing objects and advantages of the present invention, together with various other objects and advantages thereof which will become apparent, may be attained with the exemplary embodiment illustrated in the accompanying drawings and described in detail hereinafter. Referring to the drawings:

Fig. 1 is a perspective view of a respirator embodying the invention;

Fig. 2 is an enlarged sectional view through the respirator which is taken in a central, vertical plane;

Fig. 3 is an enlarged, perspective view of a retaining frame of the invention;

Fig. 4 is a bottom view of the respirator of the invention, taken as indicated by the arrowed line 4—4 of Fig. 2;

Fig. 5 is a fragmentary sectional view on an enlarged scale which is taken along the arrowed line 5—5 of Fig. 4;

Fig. 6 is a fragmentary sectional view taken along the arrowed line 6—6 of Fig. 2;

Fig. 7 is a view, partially in section, which is taken along the arrowed line 7—7 of Fig. 4; and Fig. 8 is a fragmentary elevational view taken along the arrowed line 8—8 of Fig. 6.

Referring first to Fig. 1 of the drawings, the respirator of the invention includes a mask 10 which is adapted to cover the nostrils and mouth of the wearer, a filter 11 being carried by the mask. The filter 11 may be designed to remove gases from the air inhaled by the wearer, in which case it may be filled with charcoal, for example, although other materials may be used also. Alternatively, the filter 11 may be designed to remove dust particles, or other solids, from the air, an improved filter for this purpose being described in detail hereinafter. The respirator is held against the face of the wearer by a headband 12, the ends of which are suitably secured to the mask 10, as by snap fasteners 13. The mask 10 includes a gasket 14 which is adapted to fit the face of the wearer and to make air-tight contact therewith so that only filtered air enters the interior of the mask 10. As suggested in Fig. 2 of the drawings, the gasket 14 extends from the wearer's chin to approximately the bridge of his nose and encompasses his mouth and nostrils. The structures of the gasket 14 and the cooperating parts of the mask 10 are substantially identical to those of the corresponding elements of the respirator disclosed in my aforementioned patent so that a detailed description thereof herein is unnecessary.

The mask 10 is provided with a front wall 18 having therein an air inlet opening 19 adjacent the nostrils of the wearer. The filter 11 is provided with a rear side wall 20 having therein an air outlet opening 21 which communicates with the inlet opening 19 to admit filtered air into the mask 10. The filter 11 includes a rigid tube 22 which projects rearwardly from the rear side wall 20 through the inlet opening 19 in the front wall 18 of the mask 10, the tube 22 being formed integrally with the rear side wall 20 of the filter in the particular construction illustrated. The tube 22 is encircled by an annular sealing element to gasket 23 having therein a peripheral groove 24 which receives the periphery of the inlet opening 19 in the front wall 18 of the mask 10, the periphery of the inlet opening 19 being deformed rearwardly to receive an annular portion of the gasket 23 between the front wall 18 of the mask and the rear side wall 20 of the filter.

With this construction, the gasket 23 serves two functions. First, it provides an air-tight seal between the mask 10 and the filter 11 so that the air filtered by the filter 11 cannot escape and so that unfiltered air cannot enter the mask. Secondly, it, in cooperation with the tube 22, provides a mounting means for the filter 11. As will be apparent, in order to mount the filter 11 on the mask 10, it is merely necessary to insert the tube 22 into the gasket 23, whereupon the gasket retains the mask and filter in assembled relation. If removal of the filter 11 from the mask 10 is desired for any reason, this may be accomplished readily by pulling the tube 22 out of the gasket 23, insertion of the tube 22 into the gasket and removal of the tube therefrom being facilitated by rotating the filter relative to the mask at the same time. Also, by having the tube 22 mounted on or integral with the filter 11, insertion and removal of the tube are greatly facilitated since there are no loose parts to contend with.

Mounted on the inner end of the tube 22 is an inhalation valve 28, visible in Figs. 2, 6 and 8. The valve 28 is an inwardly opening check valve which permits the flow of air from the filter 11 into the mask 10 as the wearer inhales, the valve seating against the inner end of the tube when the wearer exhales to prevent the flow of exhaled air back into the filter. The valve 28 is shown as comprising a disc of flexible material secured to the inner end of the tube 22, only one side of the valve being secured to the tube so that the other side may deflect inwardly as the wear inhales. The valve 28 may be formed of any suitable flexible material, such as plastic, for example.

The mask 10 is provided with a lower wall 29 which slopes downwardly and rearwardly from the lower edge of the front wall 18, the lower wall being provided with one or more air outlet openings 30 therein, two such outlet openings being shown. The flow of air through each outlet opening 30 is controlled by an exhalation valve 31 which comprises an outwardly opening check valve. Each exhalation valve is shown as including a disc of flexible material which is secured at its center so that the edges may deflect outwardly to permit the escape of exhaled air as the wearer exhales. The exhalation valves may be formed of any suitable flexible material. For example, they may be plastic discs, or discs of rubber-like material.

It will be noted that the inhalation valve 28 is located adjacent the wearer's nostrils so that filtered air entering the mask 10 flows directly to the wearer's nostrils as he inhales. The exhalation valves 31 are located adjacent the wearer's mouth and below the nostrils in the line of exhaled-air flow from the nostrils so that the exhaled air flows directly to the exhalation valves 31 and escapes therethrough as the wearer exhales. In this location, the exhalation valves 31 also serve as saliva and condensate drains.

Considering the filter 11 in more detail, it comprises a housing having a top wall 35, a front side wall 36, the previously discussed rear side wall 20, and end walls 37, the filter housing being open at the bottom. The end walls 37 of the filter housing are provided with single upwardly converging, substantially V-shaped notches 38 therethrough which extend from the bottom of the filter housing to points below the top wall 35 of the filter housing. Disposed in the filter housing is a filter element 41 of sheet filtering material, opposite side edges of the filter element 41 engaging the edges of the respective notches 38. Opposite end edges of the filter element respectively engage the lower edges 42 and 43 of the side walls 20 and 36. The filter element 41 is spaced inwardly from the side walls 20 and 36 and the top wall 35 of the filter housing to provide a chamber 45 for filtered air which surrounds the filter element 41 and communicates with the air outlet opening 21 in the rear side wall 20 of the filter housing. This inward spacing of the filter element 41 is accomplished by two ribs 46, Fig. 6, on the front side wall 36 and three ribs 47 on the rear side wall 20, two of the ribs 47 being in registry with the ribs 46 and the third rib 47 being disposed intermediate the first two. The ribs 47 are interrupted by the air outlet opening 21, as best shown in Fig. 7. As best shown in Fig. 2 of the drawings, the ribs 46 and 47 taper downwardly to points adjacent the lower edges 42 and 43 of the front and rear side walls 20 and 36.

The filter element 41 is held in place with its side and end edges in engagement with the edges of the notches 38 and the lower edges 42 and 43 of the side walls 20 and 36 by a removable retainer frame 50 insertable into the filter housing, preferably from the bottom. As best shown in Fig. 3 of the drawings, the frame 50 includes upwardly converging, generally triangular end walls 51 which are complementary to and insertable into the notches 38 in the end walls 37 of the filter housing. Intermediate the end walls 51 is a wall 52 of substantially the same size and shape as the end walls 51. The end and intermediate walls 51 and 52 of the frame are connected by a base 53 at the bottom of the frame and a crossbar 54 at the top of the frame, these various elements of the frame preferably being integral, as by forming the entire frame of a suitable plastic material, for example. The frame is open at the bottom to admit air into the interior thereof, as by being provided with air inlet openings 55 in the base.

When the frame is inserted into the filter housing, as best shown in Figs. 2 and 6 of the drawings, the edges of the end walls 51 thereof engage the side edges of the filter element 41 and register with the edges of the notches 38 in the end walls 37 of the filter housing so that the side edges of the filter element are clamped between the edges of the end walls 51 of the frame and the edges of the notches 38 in the filter housing. At the same time, edges 56 and 57 of the base 53 of the frame 50 engage the end edges of the filter element 41 and register with the lower edges 42 and 43 of the side walls 20 and 36 of the housing to clamp the end edges of the filter element. Thus, the frame 50 and the filter housing cooperate to provide a continuous air-tight seal around the entire periphery of the filter element 41 so that no unfiltered air can enter the filtered air chamber 45. The frame 50 is retained within the filter housing by a pivoted latch 60 which is mounted on the rear wall 20 of the filter housing and which spans the bottom of the filter housing when it locks the frame 50 in place, the latch 60 having cylindrical portion 61 which snaps into a recess 62 in the front face of the front side wall 36 adjacent the lower edge 43 thereof. As will be apparent, the latch 60 may be released readily by merely pressing the cylindrical portion 61 thereof downwardly out of the recess 62, whereupon the latch may be pivoted rearwardly out of the way so that the frame 50 may be withdrawn downwardly from the filter housing.

As best shown in Fig. 3 of the drawings, the frame 50, which is generally wedge-shaped, is provided at its apex with one or more pointed protuberances or spikes 65, these being shown as formed integrally with the crossbar 54. Before inserting the filter element 41 into the filter housing, it is convenient to wrap it around the frame 50 so that it is impaled on the spikes 65 to prevent slippage of the filter element relative to the frame. In actual practice, the spikes 65 may penetrate the filter element 41 only slightly, the term "impale" being used to describe the penetration of the filter element by the spikes. With the filter element 41 locked to the frame 50 by the spikes 65, it will be apparent that it is a simple matter to insert the frame with the filter element 41 thereon into the filter housing whenever it is desired to insert a fresh filter element, the frame thereafter being locked in place by the latch 60. Thus, the spikes 65 facilitate insertion of the filter element 41 and insure accurate positioning thereof relative to both the frame 50 and the housing so as to insure an air-tight seal all the way around the filter element.

It will be noted that the frame 50 spaces the two sides of the filter element 41 apart to form therebetween a single, relatively small, generally wedge-shaped chamber 66 for unfiltered air, this chamber being open at its bottom. When air is drawn out of the filtered air chamber 45 by the inhalation of the wearer, unfiltered air in the chamber 66 passes through the filter element 41 so that dust particles, and other solids, are removed.

As pointed out above, the chamber 66 is relatively small and is only a single chamber, as compared to the relatively large, effectively triple, chamber of my aforesaid patent. Expressed somewhat differently, the total area of the filter element 41 of the present invention is only about one third that of the filter element of my aforesaid patent. Because of the small volume of the chamber 66, the air entering it on each inhalation has a relatively high velocity, so high, in fact, that most of the solid particles entrained in the air are carried clear to the top of the chamber 66 and impinge on and are deposited on a relatively narrow band at the apex or fold of the filter element 41. Thus, the sides of the chamber 66 are relatively free of accumulations of solid particles due to the concentration thereof at the apex of the chamber as a result of inertial separation.

Comparative tests made under identical conditions with respirators constructed in accordance with the present invention and with flat filter elements of the same material and the same effective area indicate that the sides of the filter elements 41 in the respirators of the present invention accumulate only about 75% as much contaminating matter as the flat filter elements, the balance having been deposited primarily on the apices of the filter elements 41 by inertial separation. In other words, the breathing resistance of the respirator of the invention is only about 75% as much as the breathing resistance of the flat filter elements after use under identical conditions, which is an extremely important feature from the point of view of the wearer of any respirator. Similar comparative tests performed with the respirator of my aforesaid prior patent and with flat filter elements indicated no appreciable difference in either contaminating-matter accumulation, or breathing resistance, which indicates that the relatively large filtering area of my prior patent results in such low air velocities that substantially no inertial separation results.

The foregoing decreased contaminant accumulation and decreased breathing resistance were obtained with a filter element 41 having an average over-all length of approximately 4½" and having an average over-all width of 2" to 2¼", the filter element having been folded crosswise at the midpoint of its length to dispose the ends thereof approximately ½" apart. In other words, the V-shaped chamber 66 is approximately ½" wide at its widest point.

While I have disclosed an exemplary embodiment herein for purposes of illustration, it will be understood that various minor changes, modifications and substitutions may be incorporated therein without necessarily departing from the spirit of the invention as defined by the following claims.

I claim as my invention:

1. In a respirator, the combination of: a mask member adapted to fit the face of the wearer and to cover the nostrils and mouth of the wearer, said mask member having an air inlet opening; a filter member having an air outlet opening and mounted on said mask member with said air outlet opening in communication with said air inlet opening; and means for securing said filter member to said mask member, including a tube mounted on one of said members and defining said opening therein and extending through said opening in the other of said members, and including a sealing element engaging said other member adjacent the periphery of said opening therein and engaging the outer periphery of said tube so as to retain said members in assembled relation, said sealing element being provided with a peripheral groove therein which receives said periphery of said opening in said other member so as to mount said sealing element on said other member.

2. In a respirator, the combination of: a mask member adapted to fit the face of the wearer and to cover the nostrils and mouth of the wearer, said mask member having an air inlet opening; a filter member having an air outlet opening and mounted on said mask member with said air outlet opening in communication with said air inlet opening; and means for securing said filter member to said mask member, including a tube integral with one of said members and defining said opening therein and extending through said opening in the other of said members, and including a sealing element engaging said other member adjacent the periphery of said opening therein and engaging the outer periphery of said tube so as to retain said members in assembled relation.

3. In a respirator, the combination of: a mask member adapted to fit the face of the wearer and to cover the nostrils and mouth of the wearer, said mask member having an air inlet opening; a filter member having an air outlet opening and mounted on said mask member with said air outlet opening in communication with said air inlet opening; and means for securing said filter member to said mask member, including a tube integral with said filter member and defining said outlet opening therein and extending through said inlet opening in said mask member, and including a sealing element provided with a peripheral groove therein which receives the periphery of said inlet opening in said mask member so as to mount said sealing element on said mask member, said sealing element also engaging the outer periphery of said tube whereby to retain said members in assembled relation.

4. In a respirator, the combination of: a mask member adapted to fit the face of the wearer and to cover the nostrils and mouth of the wearer, said mask member having an air inlet opening; a filter member having an air outlet opening and mounted on said mask member with said air outlet opening in communication with said air inlet opening; means for securing said filter member to said mask member, including a tube mounted on said filter member and defining said outlet opening therein and extending through said inlet opening in said mask member, and including a sealing element engaging said mask member adjacent the periphery of said opening therein and engaging the outer periphery of said tube so as to retain said members in assembled relation; and an inwardly-opening inhalation valve mounted on the inner end of said tube.

5. A respirator, comprising a mask member adapted to fit the face of the wearer and to cover the nostrils and mouth of the wearer and having an air inlet opening, comprising a filter member having an air outlet opening and mounted on said mask member with said air outlet opening in communication with said air inlet opening, and comprising means for securing said filter member to said mask member, said securing means including a tube mounted on one of said members and defining said opening therein and extending through said opening in the other of said members, and said securing means including a sealing element engaging said other member adjacent the periphery of said opening therein and engaging the outer periphery of said tube so as to retain said members in assembled relation, said filter member including: a filter housing open at the bottom and having top, side and end walls, said end walls having upwardly converging, substantially V-shaped notches therethrough which extend upwardly from the bottom of said housing toward the top thereof; a filter element having edges engaging the edges of said notches and the lower edges of said side walls to form a substantially wedge-shaped chamber for unfiltered air which is open at the bottom; means on said housing and engaging said filter element for spacing said filter element from said side and top walls to form a chamber for filtered air which surrounds said filter element; and a hollow, wedge-shaped frame open at the bottom and inserted into the bottom of said housing for holding said filter element in place, said frame having end walls which close the ends of said wedge-shaped chamber and which are provided with edges registering with said edges of said notches, respectively, to clamp said filter element therebetween, and said frame having edges registering with said lower edges of said side walls, respectively, to clamp said filter element therebetween.

6. A respirator according to claim 5 wherein said air outlet opening in said filter member is in one of said side walls of said housing.

7. A respirator according to claim 5 wherein said frame is provided at the top thereof with one or more spikes impaling said filter element to prevent slippage thereof relative to said frame.

8. In a respirator, the combination of: a filter housing open at the bottom and having top, side and end walls, said end walls having upwardly converging, substantially V-shaped notches therethrough which extend upwardly from the bottom of said housing toward the top thereof; a filter element having edges engaging the edges of said notches and the lower edges of said side walls to form a substantially wedge-shaped chamber for unfiltered air which is open at the bottom; means on said housing and engaging said filter element for spacing said filter element from said side and top walls to form a chamber for filtered air which surrounds said filter element; and a hollow, wedge-shaped frame open at the bottom and inserted into the bottom of said housing for holding said filter element in place, said frame having end walls which close the ends of said wedge-shaped chamber and which are provided with edges registering with said edges of said notches, respectively, to clamp said filter element therebetween, and said frame having edges registering with said lower edges of said side walls, respectively, to clamp said filter element therebetween.

9. A respirator according to claim 8 wherein said housing is provided with an air outlet opening which is located in one of said side walls and which communicates with said chamber for filtered air.

10. A respirator according to claim 8 wherein said wedge is provided at the top thereof with one or more spikes inpaling said filter element to prevent slippage thereof relative to said frame.

11. In a respirator, the combination of: a filter housing having a generally wedge-shaped recess therein for a filter element, said recess having edges; a filter element disposed in said recess and having edges respectively engaging said edges of said recess; and a generally wedge-shaped frame inserted into said recess and having edges respectively registering with said edges of said recess and respectively engaging said edges of said filter element for clamping said edges of said filter element between said edges of said recess and said edges of said frame, said frame having thereon one or more spikes impaling said filter element to prevent slippage thereof relative to said frame.

12. In a respirator, the combination of: a filter housing having a recess therein for a filter element, said recess having edges; a filter element disposed in said recess and having edges respectively engaging said edges of said recess; and a frame inserted into said recess and having edges respectively registering with said edges of said recess and respectively engaging said edges of said filter element for clamping said edges of said filter element between said edges of said recess and said edges of said frame, said frame having thereon one or more spikes impaling said filter element to prevent slippage thereof relative to said frame.

References Cited in the file of this patent

UNITED STATES PATENTS

| | | |
|---|---|---|
| 1,832,281 | Davies | Nov. 17, 1931 |
| 2,120,231 | Cover | June 14, 1938 |
| 2,220,374 | Lewis | Nov. 5, 1940 |
| 2,295,296 | Schmidt | Sept. 8, 1942 |
| 2,342,910 | Tinnerman | Feb. 29, 1944 |
| 2,534,720 | Loose | Dec. 19, 1950 |
| 2,668,532 | Evans | Feb. 9, 1954 |

FOREIGN PATENTS

| | | |
|---|---|---|
| 3,948 | Great Britain | Feb. 15, 1913 |